US010944097B2

(12) United States Patent
Ye et al.

(10) Patent No.: US 10,944,097 B2
(45) Date of Patent: Mar. 9, 2021

(54) BAKING APPARATUS FOR SECONDARY BATTERY

(71) Applicant: Contemporary Amperex Technology Co., Limited, Ningde (CN)

(72) Inventors: Zhen Ye, Ningde (CN); Guodong Li, Ningde (CN); Hongwen Chang, Ningde (CN); Wancai Zhang, Ningde (CN); Wenqian Huang, Ningde (CN); Cunquan Wu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 182 days.

(21) Appl. No.: 16/265,384

(22) Filed: Feb. 1, 2019

(65) Prior Publication Data

US 2020/0106084 A1    Apr. 2, 2020

(30) Foreign Application Priority Data

Sep. 30, 2018   (CN) .......................... 201821611855.8

(51) Int. Cl.
*H01M 4/04* (2006.01)
*F26B 3/04* (2006.01)
*F26B 5/04* (2006.01)
*F26B 15/12* (2006.01)
*H01M 10/058* (2010.01)
(Continued)

(52) U.S. Cl.
CPC ............. *H01M 4/0471* (2013.01); *F26B 3/04* (2013.01); *F26B 5/042* (2013.01); *F26B 15/12* (2013.01); *H01M 10/058* (2013.01)

(58) Field of Classification Search
CPC ............ F26B 15/12; F26B 3/04; F26B 5/042; H01M 10/058; H01M 4/0471
See application file for complete search history.

(56) References Cited

U.S. PATENT DOCUMENTS

| 2,049,711 A * | 8/1936 | Lundy ..................... F26B 23/06 34/498 |
| 3,244,291 A * | 4/1966 | Dexter .................... B66C 13/00 414/591 |
| 2014/0296692 A1 * | 10/2014 | Iizuka .................. A61B 5/0555 600/407 |

FOREIGN PATENT DOCUMENTS

| CN | 104567309 A | 4/2015 |
| CN | 104482739 B | 6/2017 |

(Continued)

OTHER PUBLICATIONS

Extended European Search Report for European Application No. 19155809.7, dated Apr. 17, 2019, 6 pages.

*Primary Examiner* — Jorge A Pereiro
*Assistant Examiner* — Logan P Jones
(74) *Attorney, Agent, or Firm* — Law Offices of Liaoteng Wang (57) ABSTRACT

The disclosure relates to a baking apparatus for secondary battery. The baking apparatus for secondary battery comprises: a feeding device, a discharging device spaced from the feeding device in a horizontal direction, a baking device disposed between the feeding device and the discharging device, and a transferring device. The baking device comprises a baking oven including a housing and a cover for connecting hermetically with the housing. The transferring device is configured to put a secondary battery to be baked, which is conveyed by the feeding device, into the baking oven, and take the baked secondary battery out of the baking oven and convey it to the discharging device.

17 Claims, 11 Drawing Sheets

(51) Int. Cl.
     *F26B 25/10*          (2006.01)
     *F26B 9/06*           (2006.01)
     *F26B 25/00*          (2006.01)
     *F26B 25/16*          (2006.01)

(56) References Cited

FOREIGN PATENT DOCUMENTS

| | | | |
|---|---|---|---|
| CN | 106871617 A | | 6/2017 |
| CN | 108444268 A | | 8/2018 |
| CN | 108489199 A | * | 9/2018 |
| CN | 108489199 A | | 9/2018 |

* cited by examiner

BAKING APPARATUS FOR SECONDARY BATTERY

CROSS REFERENCE TO RELATED APPLICATION

The present application is based upon and claims the benefits of Chinese Patent Application No. CN 201821611855.8 filed on Sep. 30, 2018, the entire contents of which are incorporated herein by reference.

FIELD

The present disclosure relates to the technical field of battery, and in particular to a baking apparatus for secondary battery.

BACKGROUND

It is necessary to remove moisture in secondary batteries during production process. Since the electrolyte of secondary batteries is organic matter free of water molecule and the presence of water will make a great harm to the batteries and cause the batteries to be heated up and explode, the batteries shall be baked for removing moisture before the liquid injecting process and sealing process. Baking is generally adopted in moisture removing of battery. Existing baking apparatuses mainly include tunnel furnace or individual drying furnace. When a tunnel furnace or individual drying furnace bakes secondary batteries, it is necessary to provide a battery clamp to clamp up a plurality of batteries layer by layer. Then, a hoist unit transfers the battery clamp which clamps the secondary batteries, as a whole, into the furnace body. When the battery clamp is clamping secondary batteries, it is required to locate, adjust and clamp the secondary batteries, which results in complex operation and low production efficiency. In addition, it is required to use other apparatuses for cooperating with the battery clamp to feed the battery clamp into the furnace, which results in a large number of apparatuses and high production cost.

SUMMARY

The disclosure provides a baking apparatus for secondary battery. The baking apparatus for secondary battery can simplify the structure of apparatus and manufacturing procedure, which is beneficial to enhancing baking efficiency and reducing production cost.

In one aspect, the disclosure provides a baking apparatus for secondary battery comprising:

a feeding device, a discharging device spaced from the feeding device in a horizontal direction, a baking device disposed between the feeding device and the discharging device, and a transferring device, wherein the baking device comprises a baking oven comprising a housing and a cover for connecting hermetically with the housing, and wherein the transferring device is configured to put a secondary battery to be baked, which is conveyed by the feeding device, into the baking oven, and take the baked secondary battery out of the baking oven and convey it to the discharging device.

According to one aspect of the disclosure, there are two or more baking ovens arranged in a column in a direction from the feeding device to the discharging device.

According to one aspect of the disclosure, there are two or more baking devices arranged in a direction that intersects with a direction from the feeding device to the discharging device.

According to one aspect of the disclosure, the baking oven further comprises a vacuumizing unit and a venting unit which are connected to the housing.

According to one aspect of the disclosure, there are two or more baking devices successively arranged at intervals in a vertical direction.

According to one aspect of the disclosure, the baking apparatus for secondary battery further comprises a transferring and lifting device for transferring the secondary battery to be baked, which is conveyed by the feeding device, to a preset position in the vertical direction, or transferring the baked secondary battery in an upper baking device to the discharging device.

According to one aspect of the disclosure, the transferring device comprises a bracket, a beam horizontally movably connected to the bracket and a clamp component vertically movably connected to the beam.

According to one aspect of the disclosure, the baking apparatus for secondary battery further comprises a raising device for moving the cover to close the housing with the cover or move the cover away from the housing.

According to one aspect of the disclosure, at least one said raising device is provided at one of two opposing sides of the baking device, and at least one said raising device is provided on the other side, and said raising devices is configured to reciprocally move in the direction from the feeding device to the discharging device.

According to one aspect of the disclosure, the raising device comprises a guide post, a support platform vertically movably connected to the guide post, a drive unit for driving the support platform, and a bearing component disposed on the support platform, wherein the bearing component is configured to bear the cover.

According to one aspect of the disclosure, the feeding device comprises a first conveying unit, a second conveying unit disposed in intersection with the first conveying unit, a first turning unit, a first stacking unit and a first battery tray, wherein the first stacking unit is configured to transfer the secondary battery to be baked from the second conveying unit to the first battery tray, and the first battery tray is configured to horizontally move close to or away from the baking device.

According to one aspect of the disclosure, the feeding device comprises a third conveying unit, a fourth conveying unit disposed in intersection with the third conveying unit, a second turning unit, a second stacking unit and a second battery tray, wherein the second battery tray is configured to horizontally move close to or away from the baking device, the transferring device is configured to put the baked secondary battery into the second battery tray, and the second stacking unit is configured to transfer the baked secondary battery from the second battery tray to the third conveying unit.

The baking apparatus for secondary battery according to embodiments of the disclosure comprises a feeding device, a baking device and a discharging device, which are successively arranged. The transferring device of the baking apparatus for secondary battery can directly pick up a secondary battery to be baked from the feeding device, and directly transfer the same into the housing of the baking device. After the baking oven finishes the baking of the secondary battery, the transferring device can also directly pick up the baked secondary battery from the baking oven, and directly transfer the baked secondary battery to the discharging device. Thus, the baking process of secondary battery is finished. The baking apparatus for secondary battery according to the embodiment bakes the secondary battery through the baking oven in static state, and does not require a transmission unit to move the baking oven. Thereby, it effectively reduces the amount of parts, complexity of apparatus and operation, and manufacture and maintenance cost of apparatus. The baking apparatus for secondary battery according to the embodiment directly transfers the secondary battery through the transferring device between the feeding device and the baking device and between the baking device and the discharging device, and requires no dedicated clamp for multiple battery layers and no hoist unit for cooperating with the clamp. Thereby, it further reduces the amount of parts, complexity of apparatus and operation, and manufacture and maintenance cost of apparatus, and effectively improves baking efficiency at the same time.

BRIEF DESCRIPTION OF THE DRAWINGS

Features, advantages, and technical effects of exemplary embodiments of the present disclosure will be described below with reference to accompanying drawings.

The views are not necessarily plotted in actual proportion in the drawings.

DESCRIPTION OF REFERENCE SIGNS

10 baking apparatus for secondary battery;

20 first conveying unit; 21 second conveying unit; 22 first turning unit; 23 first stacking unit; 24 first battery tray;

30 third conveying unit; 31 fourth conveying unit; 32 second turning unit; 33 second stacking unit; 34 second battery tray;

40 baking device; 41 baking oven; 411 housing; 412 cover; 42 vacuumizing unit; 43 venting unit;

50 transferring device; 51 bracket; 52 beam; 53 clamp component;

60 transferring and lifting device;

70 raising device; 71 guide post; 72 support platform; 73 drive unit; 74 bearing component; 741 support block; 742 locating pin;

X horizontal direction;

Y vertical direction.

DETAILED DESCRIPTION

Below, embodiments of the present disclosure will be further described in detail with reference to the drawings and embodiments. The detailed description according to the embodiments and the accompanying drawings are intended to exemplary illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", and the like are configured for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding of the disclosure, a baking apparatus for secondary battery 10 according to embodiments of the disclosure will be described below in detail with reference to FIGS. 1 to 13.

The secondary battery according to embodiments of the disclosure may be a square battery or a soft package battery. It is necessary to bake the secondary battery prior to fluid injecting, in order to remove moisture within the secondary battery.

Figure 1:
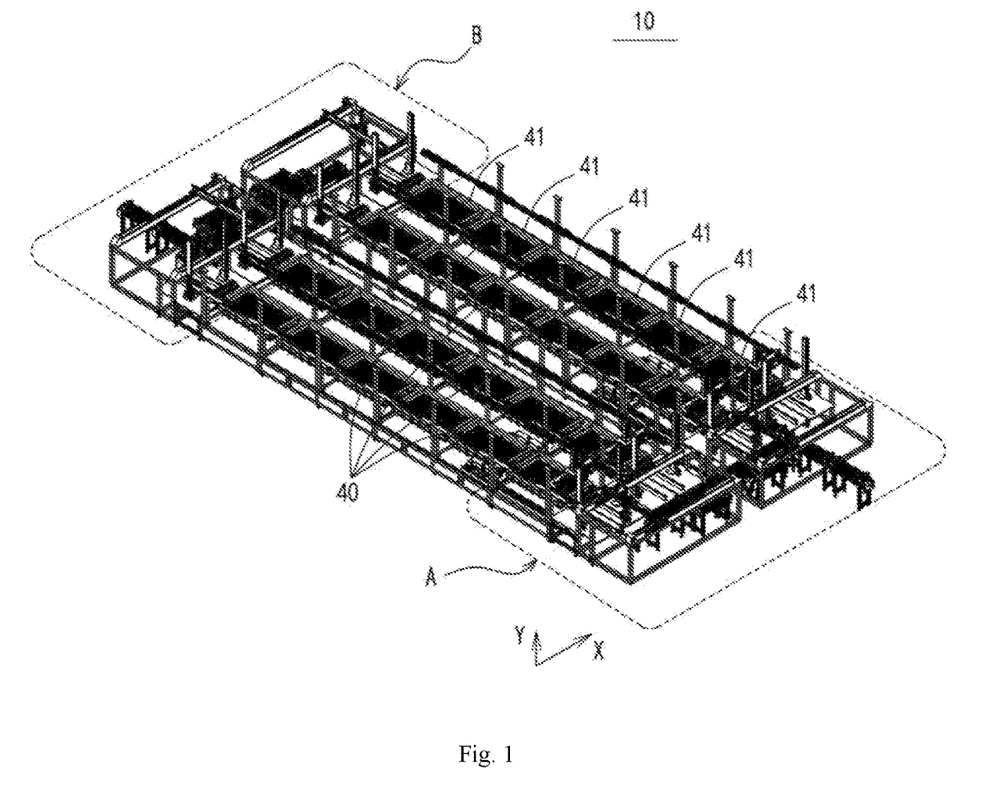
FIG. 1 is a schematic diagram showing an overall structure of a baking apparatus for secondary battery according to an embodiment of the disclosure.
Figure 2:
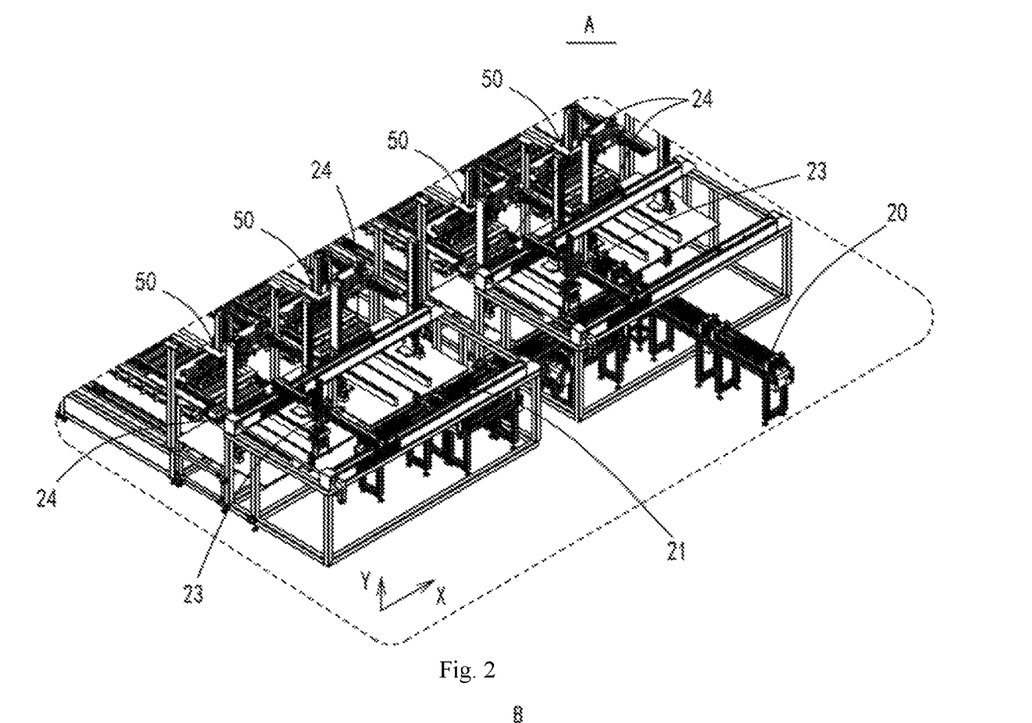
FIG. 2 is a partial enlarged diagram at portion A in FIG. 1.
Figure 3:
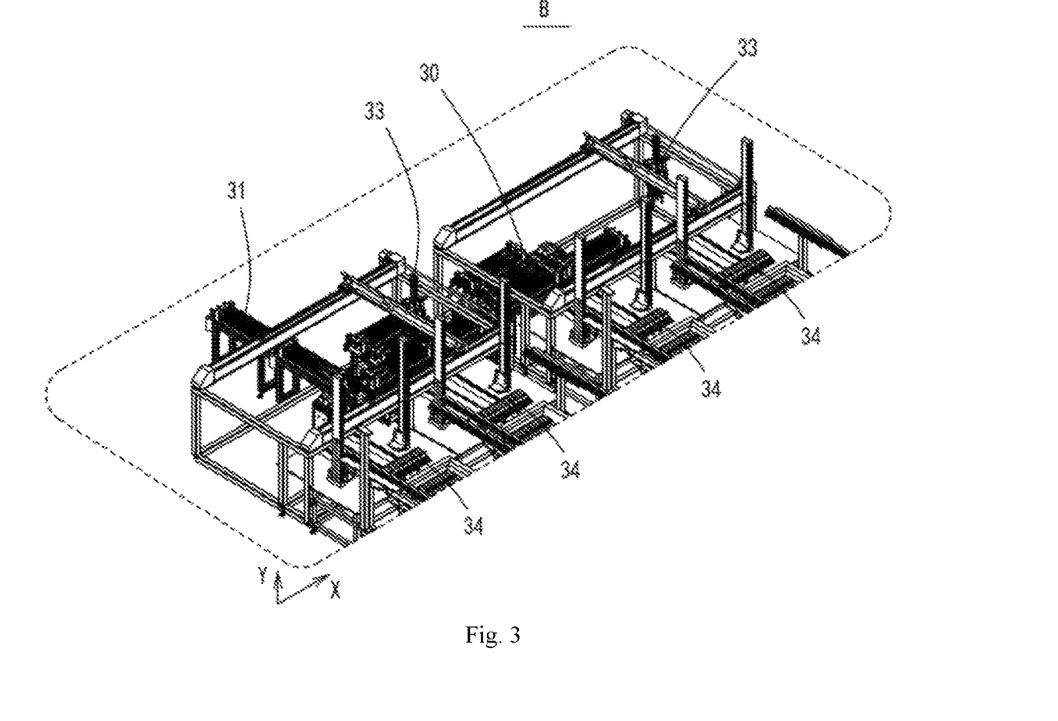
FIG. 3 is a partial enlarged diagram at portion B in FIG. 1.
Figure 6:
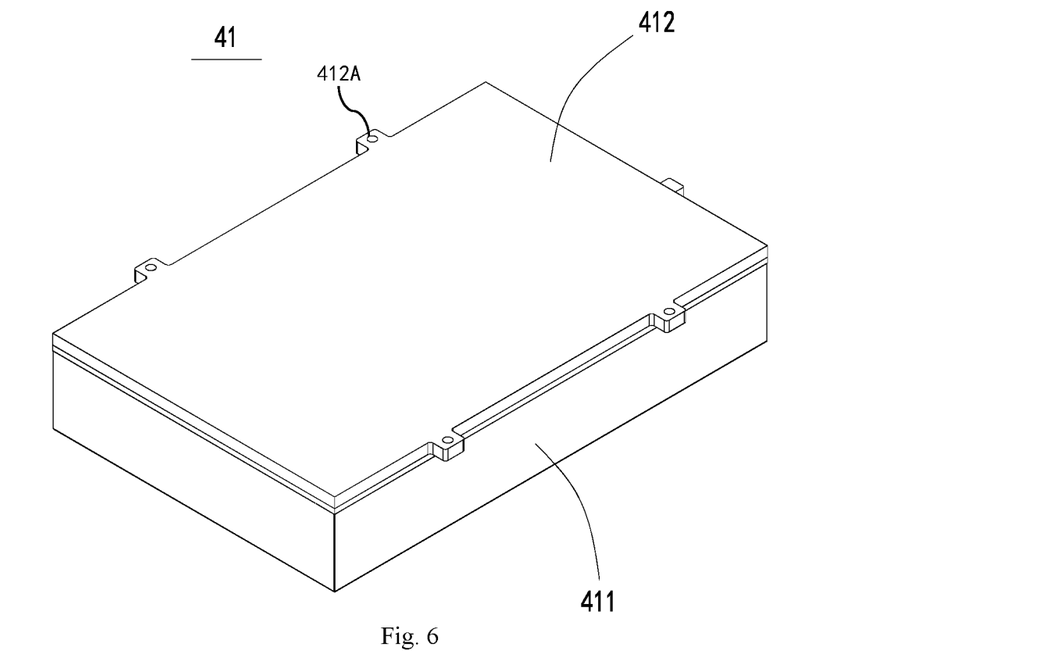
FIG. 6 is a schematic structural diagram of a baking oven according to an embodiment of the disclosure.

As shown in FIG. 1 to FIG. 3, the baking apparatus for secondary battery 10 according to an embodiment of the disclosure comprises a feeding device, a discharging device spaced from the feeding device in a horizontal direction X, a baking device 40 disposed between the feeding device and the discharging device, and a transferring device 50. The feeding device according to the embodiment is configured to convey a secondary battery to be baked to a preset feeding position. The baking device 40 in the embodiment comprises a baking oven 41. As shown in FIG. 6, the baking oven 41 comprises a housing 411 and a cover 412 for connecting hermetically with the housing 411. The housing 411 is configured to receive and bake the secondary battery. The cover 412 is configured to close the housing 411 and connect hermetically with the same. The baking oven 41 is disposed between the feeding device and the discharging device. Thereby, the secondary battery can pass the feeding device, the baking device 40 and the discharging device successively, and then be moved to a following procedure. FIG. 1 schematically shows an operation state where the baking oven 41 of the baking apparatus for secondary battery 10 according to embodiments of the disclosure is filled with secondary batteries.

The baking apparatus for secondary battery 10 according to embodiments of the disclosure comprises a feeding device, a baking device 40 and a discharging device, which are successively arranged. The transferring device 50 of the baking apparatus for secondary battery 10 can directly pick up a secondary battery to be baked from the feeding device, and directly transfer the same into the housing 411 of the baking device 40. After the baking oven 41 accomplishes baking of the secondary battery, the transferring device 50 can also directly pick up the baked secondary battery from the baking oven 41, and directly transfer the baked secondary battery to the discharging device. Thereby, a baking process of secondary battery is finished. The baking apparatus for secondary battery 10 according to the embodiment bakes the secondary battery through the baking oven 41 in static state, and does not require a transmission unit to move the baking oven 41. Thereby, it effectively reduces the amount of parts, complexity of apparatus and operation, and manufacture and maintenance cost of apparatus. The baking apparatus for secondary battery 10 according to the embodiment directly transfers the secondary battery through the transferring device 50 between the feeding device and the baking device 40 and between the baking device 40 and the discharging device, and requires no dedicated clamp for multiple battery layers and no hoist unit matching with the clamp. Thereby, it further reduces the amount of parts, complexity of apparatus and operation, and manufacture and maintenance cost of apparatus, and effectively improves baking efficiency at the same time.

Figure 4:
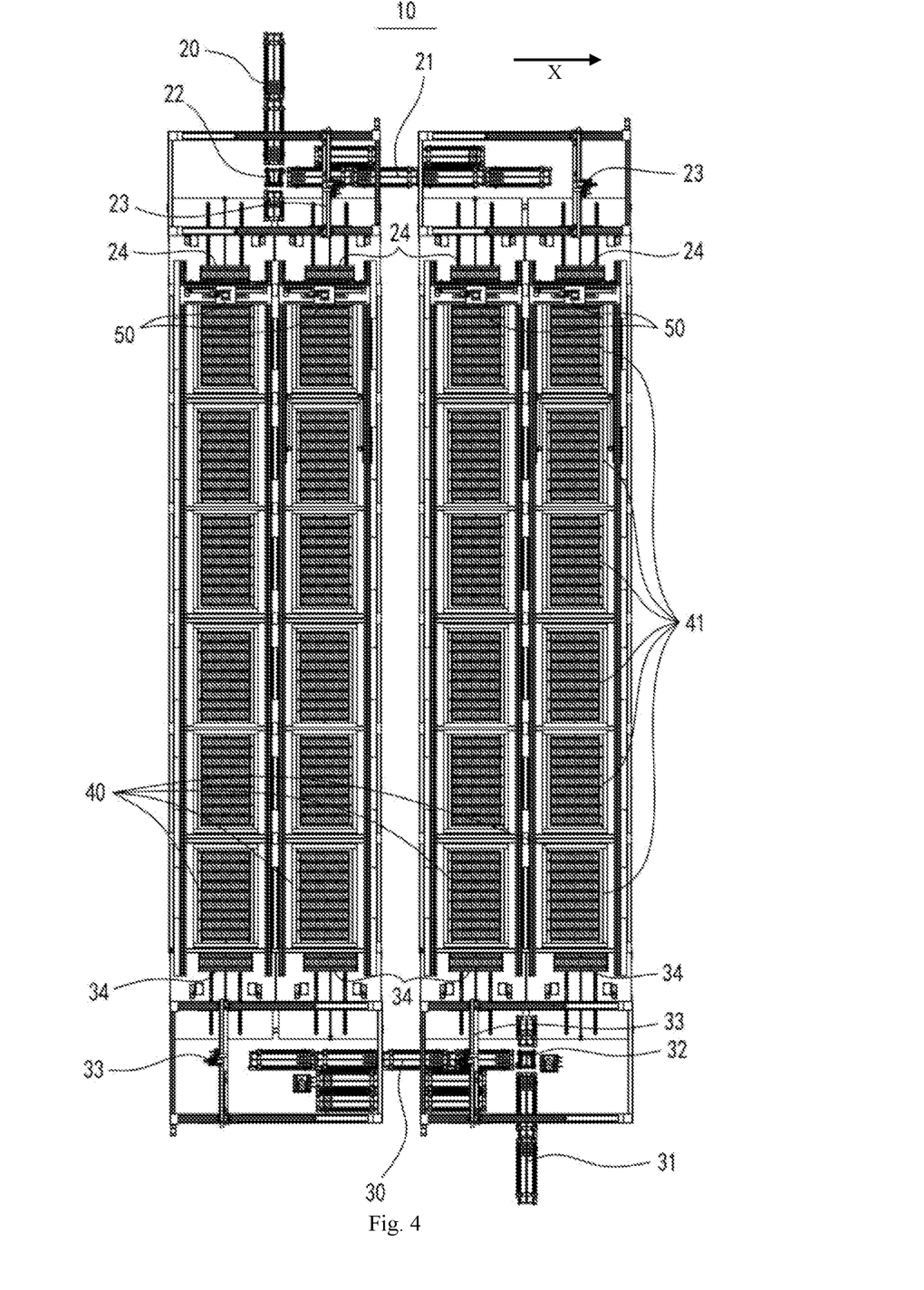
FIG. 4 is a schematic structural top view of a baking apparatus for secondary battery in operation according to an embodiment of the disclosure.
Figure 5:
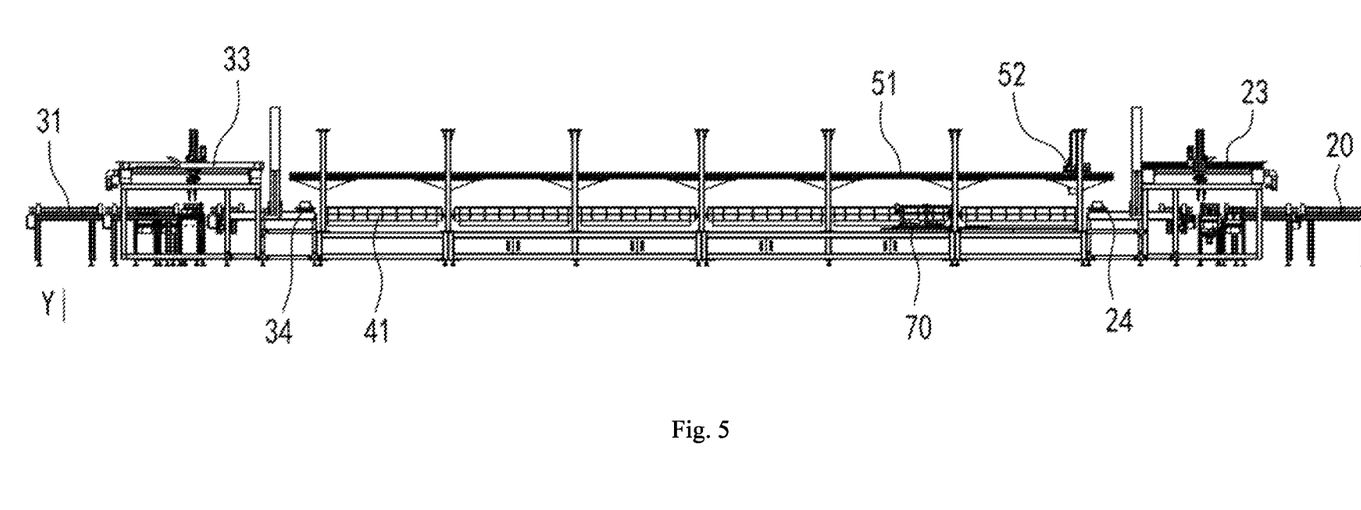
FIG. 5 is a schematic structural side view of a baking apparatus for secondary battery according to an embodiment of the disclosure.

The baking device 40 according to the embodiment of the disclosure comprises two or more baking ovens 41. The two or more baking ovens 41 are arranged in a column in a direction from the feeding device to the discharging device. In one embodiment, as shown in FIGS. 4 and 5, there are six baking ovens 41 in the embodiment. Two baking ovens 41 are arranged in a column. The six baking ovens 41 operate independently of each other. Therefore, when some of the baking ovens 41 malfunction, it is only required to repair the faulty baking ovens 41, thus the difficulty and cost of maintenance can be reduced. In addition, when the housing 411 of one of the baking ovens 41 is full of secondary batteries, it is possible to cover the cover 412 to start the baking process, and the transferring device 50 can continue to fill other baking ovens 41 with secondary batteries. Thereby, it is possible to ensure a uniform production rate and effectively improve production efficiency. When the baking oven 41 closest to the discharging device finishes filling with secondary batteries, the baking oven 41 closest to the feeding device finishes the baking process. Then, the cover 412 of the baking oven 41 closest to the feeding device is removed, and the transferring device 50 can pick up the baked secondary batteries and transfer the same to the discharging device. After that, this baking oven 41 will be filled with secondary batteries again. After this baking oven 41 finishes the filling process, the adjacent baking oven 41 finishes the baking process. The above procedure is repeated, thus it can be adequately ensured that the baking apparatus for secondary battery 10 is always in operation, the production rate is controlled well, and the idle time of the baking apparatus for secondary battery 10 is reduced. Thereby, the production efficiency can be effectively improved. In the embodiment, a cover 412 to be removed from a baking oven 41 that finishes the baking process may be placed on another cover 412 of an adjacent baking oven 41. After the transferring device 50 finishes filling of the housing 411 of the baking oven 41 with secondary batteries, the cover 412 is moved back onto the housing 411 of the baking oven 41. In this way, there is no need to individually provide a support frame and the like for the cover 412, and thereby it is possible to save space and reduce part amount of the apparatus. The amount of baking ovens 41 in the embodiment is not limited to six, but can be increased or decreased flexibly based on the size of installation space. Each baking oven 41 can be a modular construction, and the amount of the baking ovens can be adjusted flexibly depending on the processing requirement of production line. Thereby, it is possible to improve flexibility and adaptability of the baking apparatus for secondary battery 10, which make the baking apparatus for secondary battery 10 more conducive for flexible production.

FIG. 4 schematically shows an operation state where a baking oven 41 of a baking apparatus for secondary battery 10 according to embodiments of the disclosure is filled with secondary batteries.

The baking apparatus for secondary battery 10 according to the embodiment of the disclosure further comprises a heating unit (not shown). The heating unit comprises a heating element disposed in the housing 411 of the baking oven 41 and an electric control element connected to the heating element. Optionally, the heating element is a resistance heating wire.

In one embodiment, the housing 411 of the baking oven 41 has an opening upwards. The transferring device 50 can put in or take out secondary batteries in a vertical direction Y. The cover 412 can cover the housing 411 from above. Thereby, the cover 412 effectively increases press on the housing 411 due to its own weight, and further improves leakproofness therebetween. The cover 412 can be covered on or removed from the housing 411 through vertical and horizontal movement. The movement is simple and easy to operate, thereby reducing movement difficulty of the cover 412. Optionally, the space inside the housing 411 has a rectangle shape, thus it is convenient to arrange secondary batteries inside the housing 411 in rows and columns to take full advantage of the space inside the housing 411.

Figure 7:
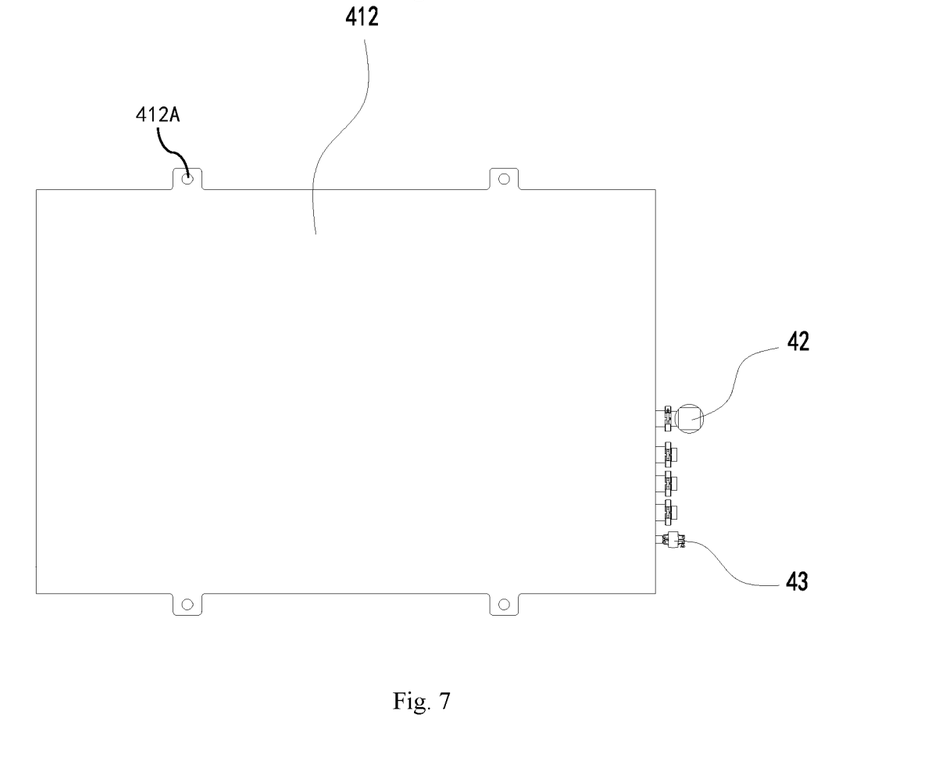
FIG. 7 is a schematic structural diagram of a baking oven according to another embodiment of the disclosure.

As shown in FIG. 7, the baking oven 41 according to the embodiment further comprises a vacuumizing unit 42 and a venting unit 43 connected to the housing 411. After the housing 411 and the cover 412 are hermetically connected, the vacuumizing unit 42 is activated to vacuumize the interior of the baking oven 41, such that the baking oven 41 has a vacuum interior, which lowers boiling point of water and prompts rapid evaporation of moisture. After the baking oven 41 finishes the baking process, the venting unit 43 is activated such that the pressure inside the baking oven 41 is balanced with the atmospheric pressure, thus it is easy to open the cover 412.

The baking apparatus for secondary battery 10 according to the embodiment further comprises a raising device 70. The raising device 70 is configured to move the cover 412, in order to cover the housing 411 with the cover 412 or remove the cover 412 from the housing 411. After the housing 411 of the baking oven 41 is full of secondary batteries, the raising device 70 lifts the cover 412 and moves the same above the housing 411, and then lowers the height of the cover 412. When the cover 412 seals the housing 411, the raising device 70 releases the cover 412. After the baking oven 41 finishes the baking process, the raising device 70 lifts the cover 412 to open the housing 411. Then, the raising device 70 moves in a horizontal direction X, and moves the cover 412 above a platform for supporting the cover 412, and lowers the height of the cover 412 until this cover 412 contacts with the platform for supporting the cover 412, and then the raising device 70 is stopped. In the embodiment where the baking device 40 comprises two or more baking ovens 41, the raising device 70 moves in the horizontal direction X, moves the cover 412 above another cover 412 of an adjacent baking oven 41, and lowers the height of the cover 412 until this cover 412 contacts with the another cover 412 below, and then the raising device 70 is stopped.

When there are one or two baking devices 40 in the embodiment, it is possible to provide only one raising device 70. When there is only one baking device 40, one raising device 70 can be provided at a side of the baking device 40, and can carry the covers 412 of two baking ovens 41. When there are two baking devices 40, one raising device 70 can be provided between the two baking devices 40, and can carry the covers 412 of the baking ovens 41 in the two baking devices 40.

In the embodiment, there may be two raising devices 70. One raising device 70 is provided at one of the two opposing sides of the baking device 40, and another raising device 70 is provided at the other side. The two raising devices 70 cooperate to support or move one cover 412. Both raising devices 70 can reciprocally move in the direction from the feeding device to the discharging device such that the two raising devices 70 can lift or move the cover 412 of each baking oven 41. It is possible to improve use ratio of the raising device 70 and reduce part amount of the apparatus. However, the amount of raising devices 70 in the embodiment is not limited to two, but also can be more than two. In this way, at least one raising device 70 is provided at one side of the two opposing sides of the baking device 40, and at least one other raising device 70 is provided at the other side.

Figure 8:
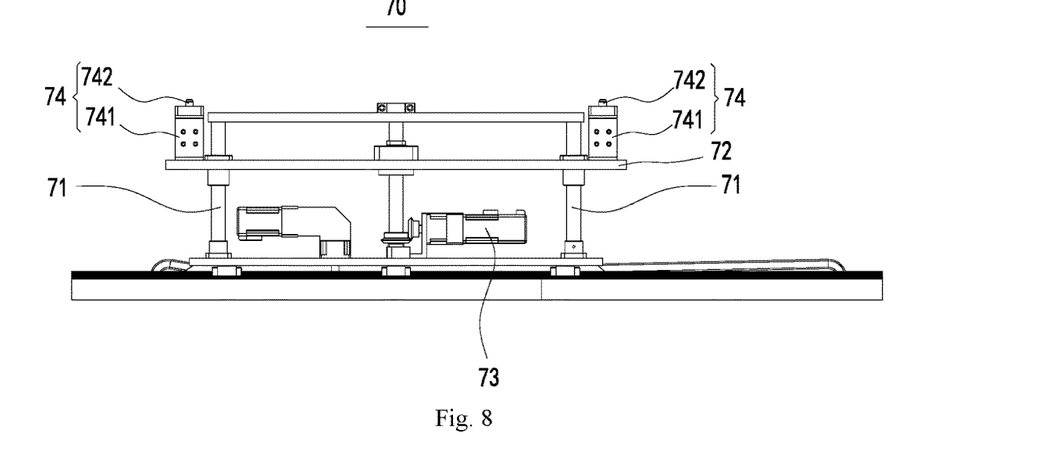
FIG. 8 is a schematic structural diagram of a raising device according to an embodiment of the disclosure.
Figure 9:
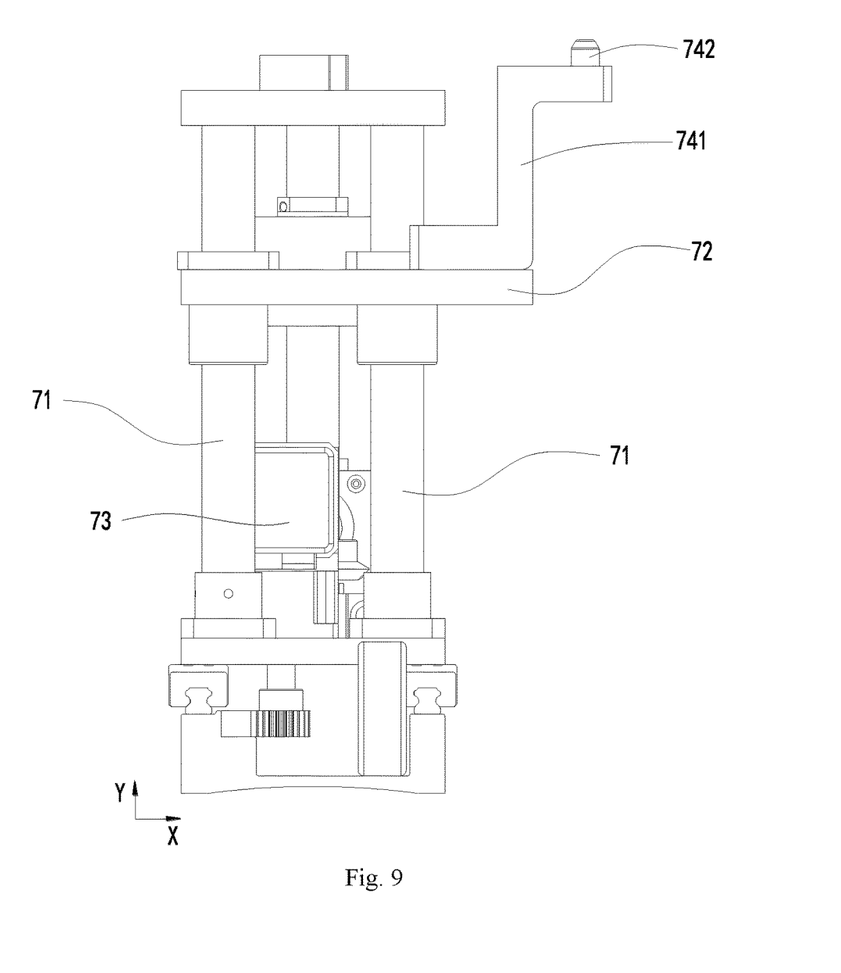
FIG. 9 is a schematic structural side view of the raising device of FIG. 8.

As shown in FIGS. 8 and 9, the raising device 70 according to the embodiment comprises a guide post 71, a support platform 72 vertically movably connected to the guide post 71, a drive unit 73 for driving the support platform 72, and a bearing component 74 disposed on the support platform 72. The bearing component 74 is configured to bear the cover 412. In the embodiment, there are four guide posts 71. The four guide posts 71 are arranged in a matrix. The support platform 72 has four guide holes. The guide posts 71 are inserted into the guide holes of the support platform 72. The drive unit 73 is provided below the support platform 72. In an example, the drive unit 73 comprises a threaded post disposed in parallel with the guide posts 71 and a motor which drives the threaded post to rotate. The support platform 72 has a threaded hole thereon to cooperate with the threaded post. When the motor drives the threaded post to rotate, the support platform 72 can be driven to move in an axial direction of the threaded post (i.e. the vertical direction Y). In one embodiment, the bearing component 74 comprises a support block 741 connected to the support platform 72 and a locating pin 742 disposed on the support block 741. The cover 412 comprises a locating hole 412A for cooperating with the locating pin 742. The support component can precisely cooperate with a locating hole 412A in the cover 412 via the locating pin 742, such that the support component can be rapidly connected to the cover 412 and the operation efficiency of the raising device 70 can be improved.

Figure 10:
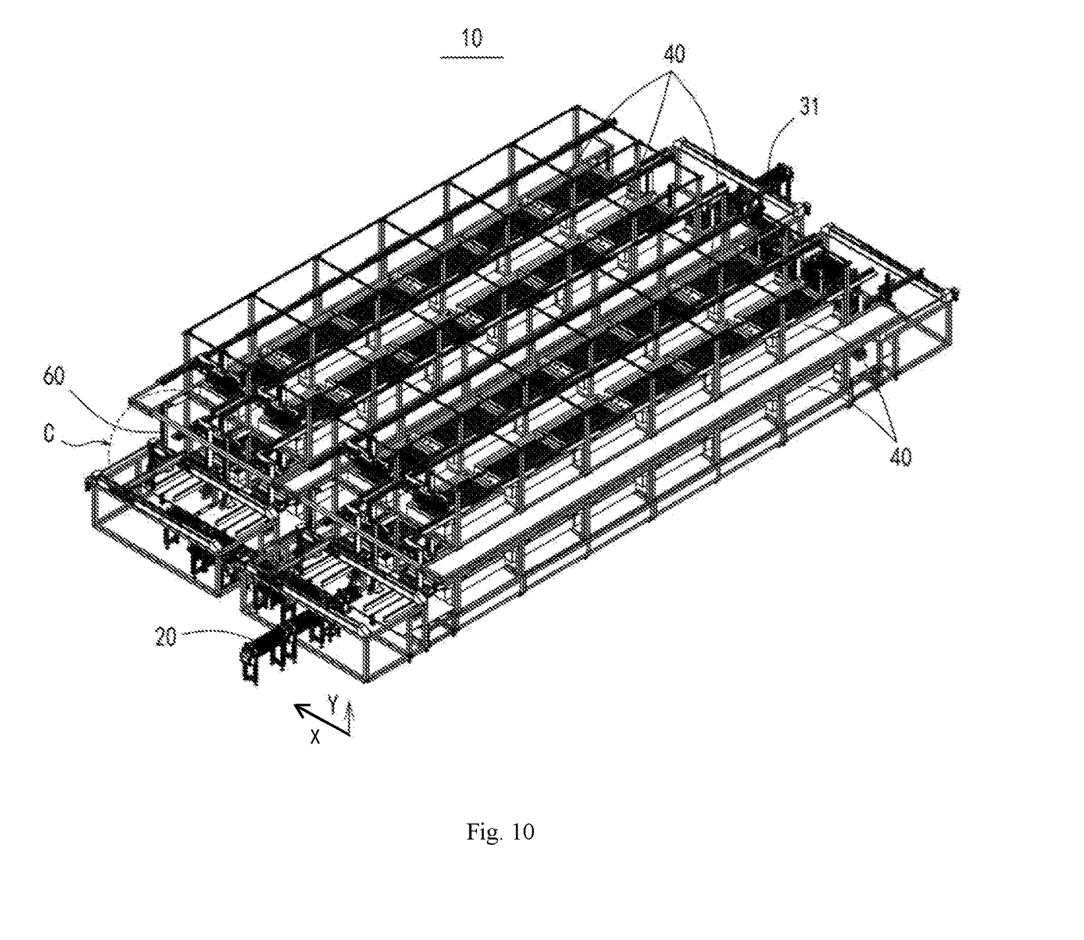
FIG. 10 is a schematic overall structural diagram of a baking apparatus for secondary battery according to another embodiment of the disclosure.
Figure 12:
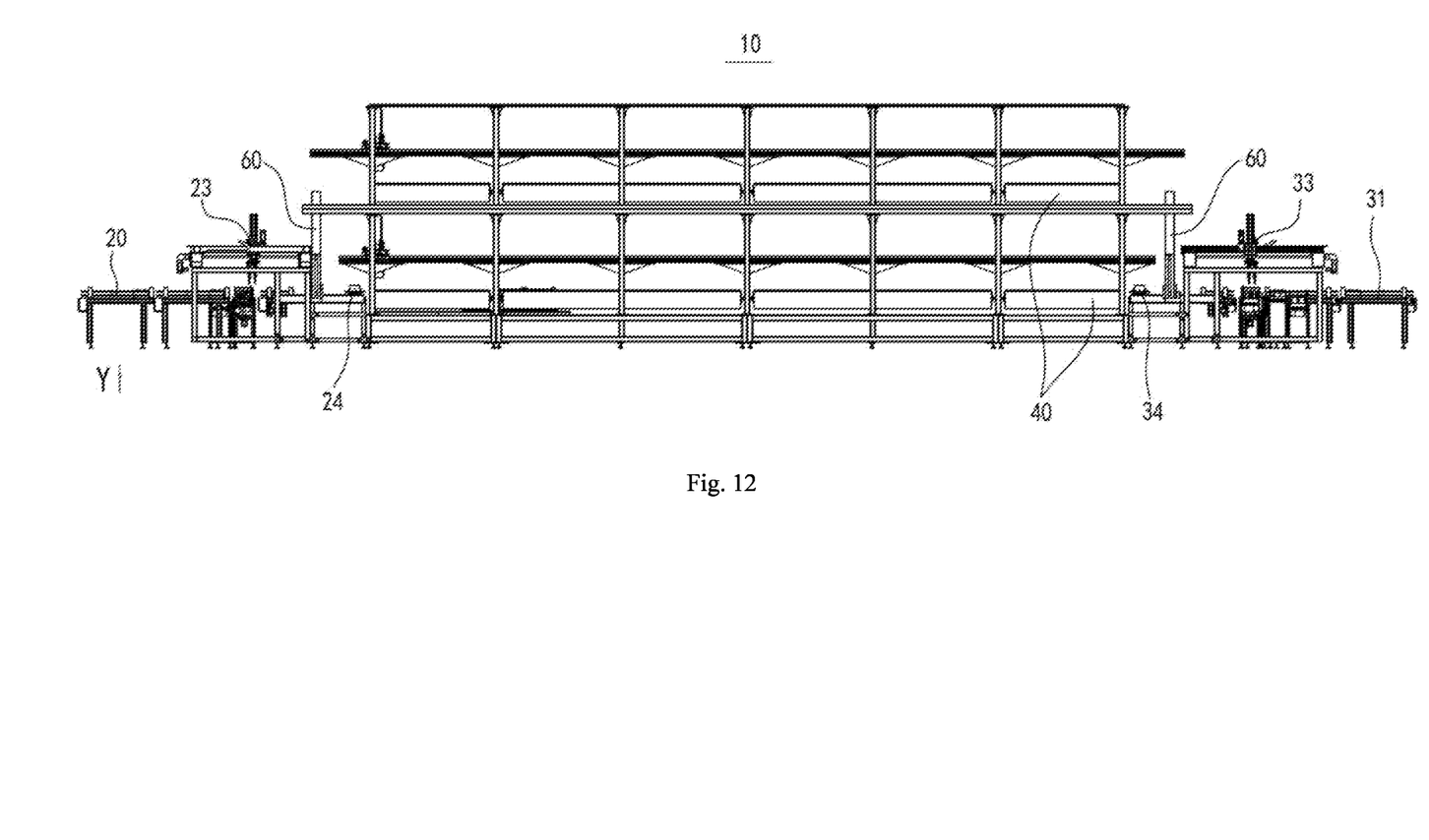
FIG. 12 is a schematic structural side view of a baking apparatus for secondary battery according to another embodiment of the disclosure.

In the embodiment of the disclosure, there are two or more baking devices 40. In one embodiment, as shown in FIG. 1 or FIG. 4, two or more baking devices 40 are arranged in a direction that intersects with the direction from the feeding device to the discharging device. Each baking device 40 comprises two or more baking ovens 41 arranged in a column. In this way, two or more baking devices 40 can form a plurality of columns of baking ovens 41 in the horizontal direction X. The various columns of baking ovens 41 can operate independent of each other. In another embodiment, as shown in FIG. 10 or FIG. 12, two or more baking devices 40 are arranged in the vertical direction Y. In this way, two or more baking devices 40 can form a multiple-layer arrangement in the vertical direction Y. The various layers of baking devices 40 can operate independent of each other. In yet another embodiment, there are three or more baking devices 40, which can be stacked in both the horizontal direction X and the vertical direction Y. Thereby, there are multiple baking devices 40 in the horizontal direction X and multiple baking devices 40 in layers in the vertical direction Y. In conclusion, the baking devices 40 can be modular, and thereby it is possible to flexibly increase or decrease the amount of the baking devices 40 depending on the size of the actual plant or production requirement. If there are two or more baking devices 40 in the embodiment, it is possible to effectively improve baking efficiency of secondary battery and shorten production cycle. In one embodiment, the baking device 40 comprises two or more baking ovens 41 arranged in a column.

Figure 11:
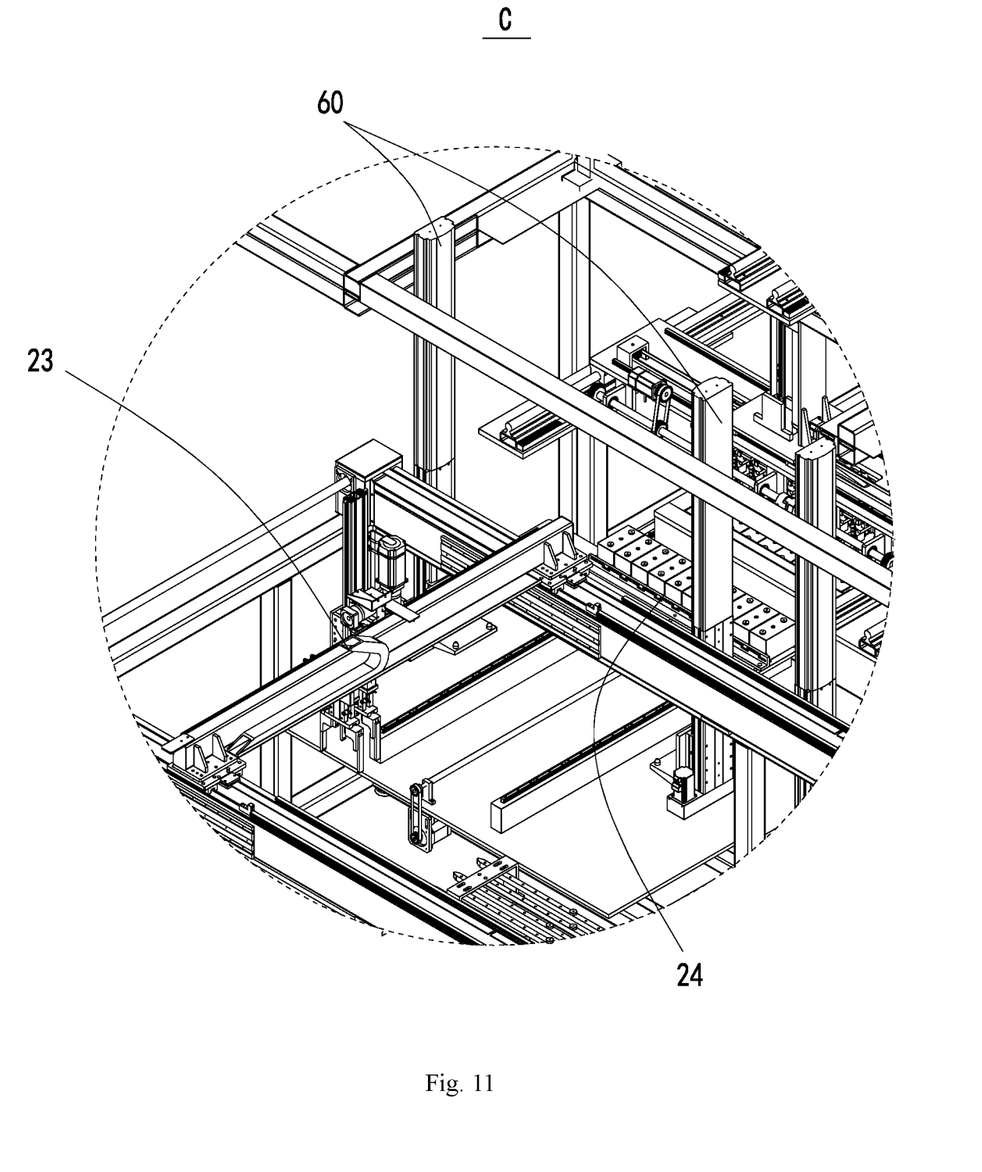
FIG. 11 is a partial enlarged diagram at portion C in FIG. 10.

In one embodiment, as shown in FIGS. 10 and 11, two or more baking devices 40 are arranged in the vertical direction Y. In order to convey the secondary batteries to be baked to a baking device 40 in an upper layer or move the baked secondary batteries in the baking device 40 in the upper layer to the discharging device, the baking apparatus for secondary battery 10 according to the embodiment further comprises a transferring and lifting device 60. The transferring and lifting device 60 is configured to transfer the secondary batteries to be baked, which are conveyed by the feeding device, to a preset position in the vertical direction Y. The transferring and lifting device 60 is also configured to transfer the baked secondary batteries baked from the baking device 40 in the upper layer to the discharging device. The transferring and lifting device 60 can improve transferring efficiency of secondary battery, thereby effectively improving the overall production efficiency of the baking apparatus for secondary battery 10. Optionally, the transferring and lifting device 60 in the embodiment comprises two posts disposed at an interval, holding plates each of which is disposed on a respective post and a motor element for driving the holding plates to move up and down. The two holding plates can hold up a structural element which carries secondary batteries, wherein the two holding plates are driven by the motor element to move up and down along the post to transfer and lift the secondary batteries. FIG. 10 schematically shows an operation state where a baking oven 41 of a baking apparatus for secondary battery 10 according to the embodiment of the disclosure is filled with secondary batteries.

In the embodiment as shown in FIG. 1, there are four baking devices 40. Two baking devices 40 share one transferring device 50. However, the embodiment does not exclude that the case in which the transferring device 50 can cooperate with different amount of baking devices 40. In the embodiment as shown in FIG. 10, there are eight baking devices 40, which are arranged in two layers in the vertical direction Y. Each layer comprises two baking devices 40 and two transferring devices 50. Every two baking devices 40 share one transferring device 50. However, the embodiment does not limit the relationship between the amounts of the transferring device 50 and the baking devices 40.

Figure 13:
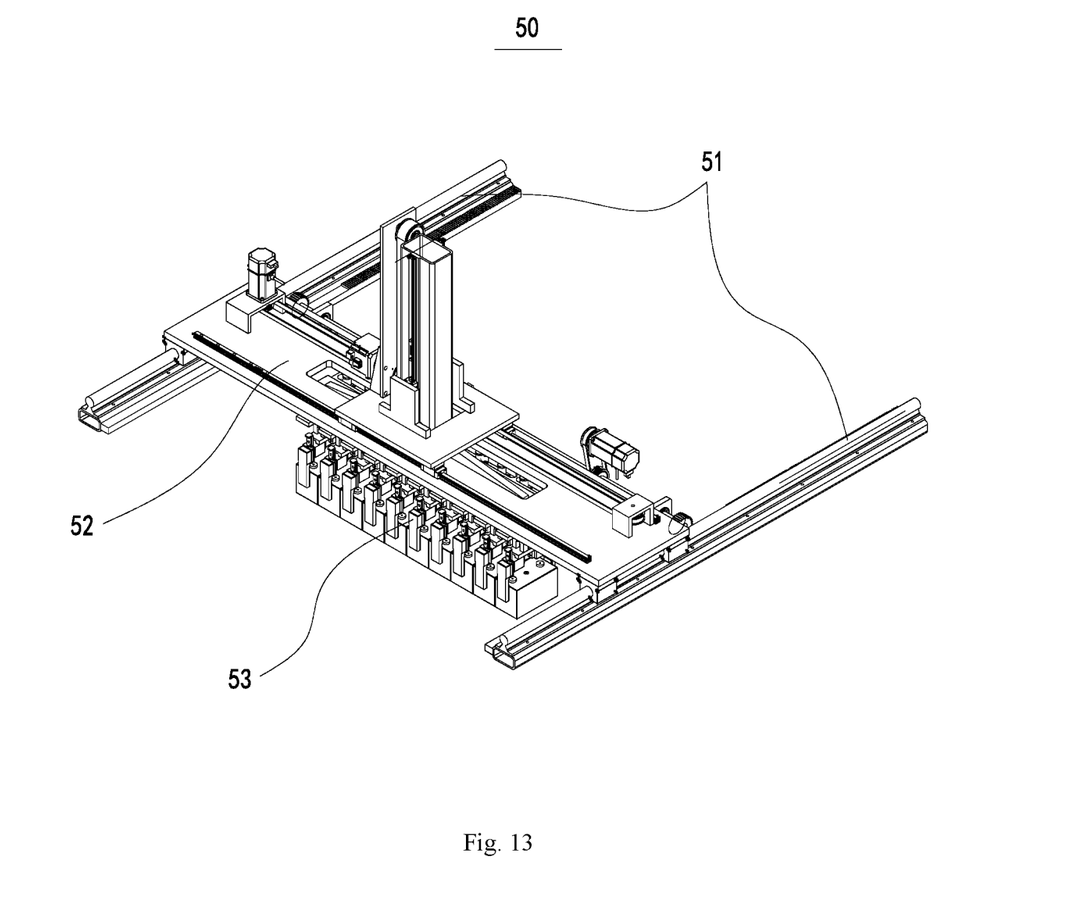
FIG. 13 is a schematic partial structural diagram of a transferring device according to an embodiment of the disclosure.

As shown in FIG. 13, the transferring device 50 according to the embodiment comprises a bracket 51, a beam 52 horizontally movably connected to the bracket 51 and a clamp component 53 vertically movably connected to the beam 52. The bracket 51 is fixed on ground or other mounting platform. In one example, each transferring device 50 comprises two brackets 51. Two baking devices 40 are provided between the two brackets 51. A horizontal guide rail is provided at the top of the bracket 51. The beam 52 is slidably connected to the horizontal guide rail. The beam 52 can be driven by a power element to move horizontally. The beam 52 is provided with a vertical guide rail. The clamp component 53 is slidably connected to the vertical guide rail. The clamp component 53 can be driven by a power element to move up and down along the vertical guide rail.

As shown in FIGS. 2 to 4, the feeding device according to the embodiment comprises a first conveying unit 20, a second conveying unit 21 disposed in intersection with the first conveying unit 20, a first turning unit 22, a first stacking unit 23 and a first battery tray 24. The first stacking unit 23 can transfer the secondary batteries to be baked from the second conveying unit 21 to the first battery tray 24. The first battery tray 24 can move horizontally close to or away from the baking device 40. The secondary batteries to be baked firstly enter the first conveying unit 20, and then move to the first turning unit 22. The first turning unit 22 rotates for a preset angle to align the secondary batteries to the second conveying unit 21. Then, the second conveying unit 21 conveys the secondary batteries to the preset position. The first stacking unit 23 picks up the secondary batteries from the second conveying unit 21 and successively stacks the same on the first battery tray 24. Multiple secondary batteries are arranged in columns on the first battery tray 24. After the first battery tray 24 is full of secondary batteries, the first battery tray 24 moves to a filling position close to the baking device 40. In the end, the transferring device 50 picks up secondary batteries from the first battery tray 24 and puts the same into the housing 411. After all the secondary batteries on the first battery tray 24 are removed, the first battery tray 24 moves to the initial position away from the baking device 40, waiting for next filling of second batteries by the first stacking unit 23.

The discharging device according to the embodiment comprises a third conveying unit 30, a fourth conveying unit 31 disposed in intersection with the third conveying unit 30, a second turning unit 32, a second stacking unit 33 and a second battery tray 34. The transferring device 50 can transfer the baked secondary batteries to the second battery tray 34. The second battery tray 34, after being filled with a preset amount of secondary batteries, moves to a preset position away from the baking device 40. The second stacking unit 33 can pick up secondary batteries from the second battery tray 34 and transfer the same to the third conveying unit 30. After all the secondary batteries on the second battery tray 34 are removed, the second battery tray 34 moves to the initial position close to the baking device 40, waiting for next filling of second batteries by the transferring device 50. The third conveying unit 30 conveys the secondary batteries to the second turning unit 32. The second turning unit 32 rotates for a preset angle to align the secondary batteries to the fourth conveying unit 31. Then the fourth conveying unit 31 conveys the secondary batteries to a preset position.

The baking apparatus for secondary battery 10 according to embodiments of the disclosure comprises a feeding device, a baking device 40 and a discharging device, which are successively arranged. The transferring device 50 can directly pick up a secondary battery to be baked from the feeding device, and directly transfer the same into the housing 411 of the baking device 40. After the baking oven 41 finishes the baking of the secondary battery, the transferring device 50 can also directly pick up the baked secondary battery from the baking oven 41, and directly transfer the baked secondary battery to the discharging device. Thereby, the baking process of secondary battery is finished. The baking apparatus for secondary battery 10 according to the embodiment bakes the secondary battery through the baking oven 41 in static state, and does not require a transmission unit such as scraping belt or roller for the baking oven 41. Thereby, it effectively reduces the amount of parts, complexity of apparatus and operation, and manufacture and maintenance cost of apparatus. In addition, the baking apparatus for secondary battery 10 according to the embodiment directly transfers the secondary battery through the transferring device 50 between the feeding device and the baking device 40 and between the baking device 40 and the discharging device, and requires no dedicated clamp for multiple battery layers and no hoist unit matching with the clamp. Thereby, it further reduces the amount of parts, complexity of apparatus and operation, and manufacture and maintenance cost of apparatus, and effectively improves baking efficiency at the same time.

Figure 14:
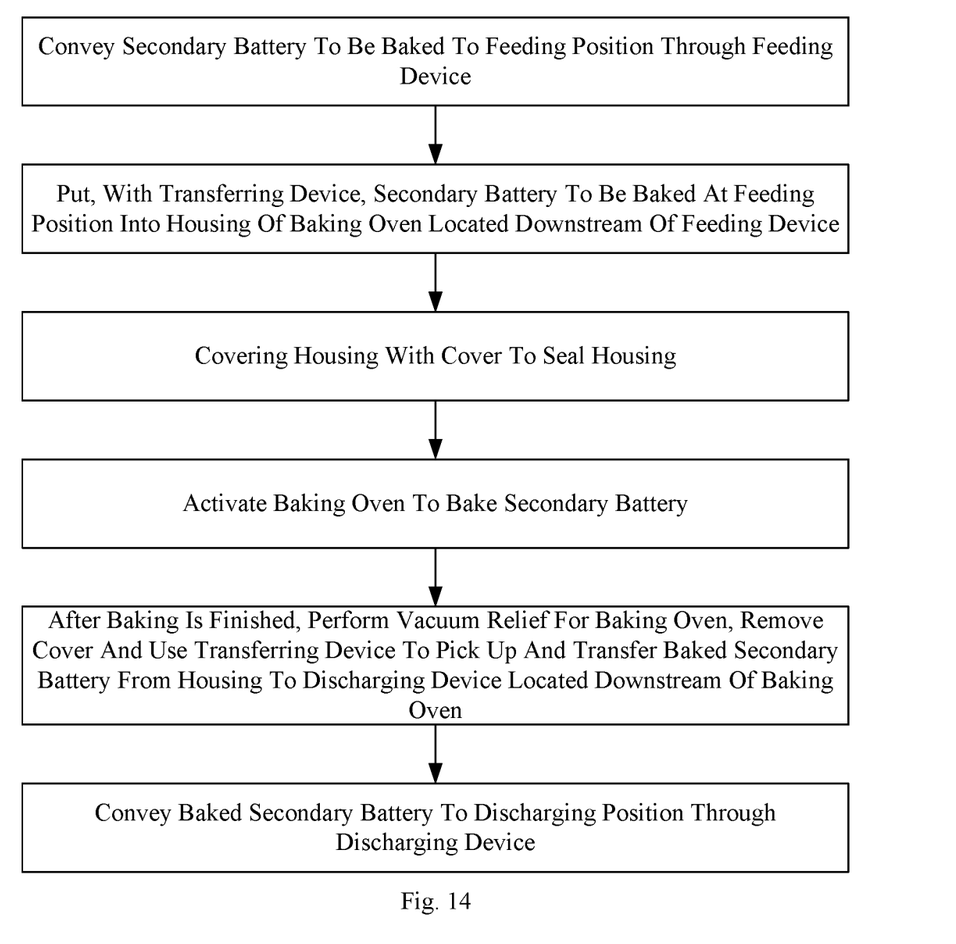
FIG. 14 is a flow chart of a secondary battery baking method according to an embodiment of the disclosure.

FIG. 14 schematically shows a flow chart of a secondary battery baking method according to an embodiment of the disclosure. An embodiment of the disclosure provides a secondary battery baking method, as shown in FIG. 14, which comprises the steps of:

conveying a secondary battery to be baked to a feeding position through a feeding device;

putting, with a transferring device 50, the secondary battery to be baked at the feeding position into an housing 411 of a baking oven 41, wherein the baking oven 41 is located downstream of the feeding device;

covering the housing 411 with an cover 412 to seal the housing 411;

activating the baking oven 41 to bake the secondary battery;

after the baking is finished, performing vacuum relief for the baking oven 41, removing the cover 412 and using the transferring device 50 to transfer the baked secondary battery to a discharging device which is located downstream of the baking oven 41; and conveying the baked secondary battery to a discharging position through the discharging device.

The secondary battery baking method according to embodiments of the disclosure uses the feeding device, the transferring device 50, the baking oven 41 and the discharging device to finish the baking of secondary batteries. Since the secondary batteries are transferred directly to the baking oven 41 through the transferring device 50 and can also be removed from the baking oven 41 through the same, during the whole baking process, it is not required to fix the secondary batteries by a dedicated clamp or use a dedicated hoist unit to transfer the clamp that is carrying the secondary batteries. Thereby, it is possible to eliminating the following processes of adjusting the clamp, filling the clamp with the secondary batteries, locating the secondary batteries in the clamp, locking the secondary batteries, hoisting the clamp with a hoist unit and so on. Therefore, it is possible to effectively lower difficulty of transferring the secondary batteries, improve transferring efficiency of secondary batteries, save transferring time and improve the overall baking efficiency of secondary batteries.

In the embodiment, there may be two or more baking ovens 41. The two or more baking ovens 41 are arranged in a column between the feeding device and the discharging device.

In the secondary battery baking method according to the embodiment, the baking oven 41 is vacuumized before the baking oven 41 is activated. When the baking oven 41 is in a vacuum state, it is possible to lower boiling point of water, prompt rapid evaporation of moisture, and also lower energy consumption of the apparatus.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. An apparatus for baking a secondary battery, comprising:
   a feeding device, a discharging device spaced from the feeding device in a horizontal direction, a baking device disposed between the feeding device and the discharging device, and a transferring device,
   wherein the baking device comprises two or more baking ovens fixedly arranged in a column in a direction from the feeding device to the discharging device, each baking oven comprising a housing and a cover for connecting hermetically with the housing, and wherein the transferring device is configured to put a secondary battery to be baked, which is conveyed by the feeding device, into each baking oven, and take the baked secondary battery out of each baking oven and convey it to the discharging device,
   wherein the baking apparatus further comprises a raising device for moving each cover to close each housing with each cover or move each cover away from each housing,
   said raising device is configured to reciprocally move in the direction from the feeding device to the discharging device,
   wherein the feeding device comprises a first conveying unit, a second conveying unit disposed in intersection with the first conveying unit, a first turning unit, a first stacking unit and a first battery tray, wherein the first stacking unit is configured to transfer the secondary battery to be baked from the second conveying unit to the first battery tray, and the first battery tray is configured to horizontally move close to or away from the baking device.

2. The baking apparatus for secondary battery of claim 1, wherein there are two or more baking devices arranged in a direction that intersects with a direction from the feeding device to the discharging device.

3. The baking apparatus for secondary battery of claim 1, wherein the baking oven further comprises a vacuumizing unit and a venting unit which are connected to the housing.

4. The baking apparatus for secondary battery of claim 1, wherein there are two or more baking devices successively arranged at intervals in a vertical direction.

5. The baking apparatus for secondary battery of claim 4, wherein the baking apparatus further comprises a transferring and lifting device for transferring the secondary battery to be baked, which is conveyed by the feeding device, to a preset position in the vertical direction, or transferring the baked secondary battery in an upper baking device to the discharging device.

6. The baking apparatus for secondary battery of claim 1, wherein the transferring device comprises a bracket, a beam horizontally movably connected to the bracket and a clamp component vertically movably connected to the beam.

7. The baking apparatus for secondary battery of claim 1, wherein there are two or more raising devices, a raising device being provided at each of two opposing sides of the baking device.

8. The baking apparatus for secondary battery of claim 1, wherein the raising device comprises a guide post, a support platform vertically movably connected to the guide post, a drive unit for driving the support platform, and a bearing component disposed on the support platform, wherein the bearing component is configured to bear the cover.

9. The baking apparatus for secondary battery of claim 8, wherein the bearing component comprises a support block connected to the support platform and a locating pin disposed on the support block, and the cover comprises a locating hole for cooperating with the locating pin.

10. The baking apparatus for secondary battery of claim 1, wherein the heating unit comprises a heating element disposed in the housing of the baking oven and an electric control element connected to the heating element.

11. The baking apparatus for secondary battery of claim 6, wherein a horizontal guide rail is provided at the top of the bracket, and the beam is slidably connected to the horizontal guide rail; and wherein the beam is provided with a vertical guide rail, and the clamp component is slidably connected to the vertical guide rail.

12. The baking apparatus for secondary battery of claim 1, wherein there are three or more baking devices, which are arranged at intervals in both the horizontal direction and a vertical direction.

13. The baking apparatus for secondary battery of claim 1, wherein the feeding device comprises a third conveying unit, a fourth conveying unit disposed in intersection with the third conveying unit, a second turning unit, a second stacking unit and a second battery tray, wherein the second battery tray is configured to horizontally move close to or away from the baking device, the transferring device is configured to put the baked secondary battery into the second battery tray, and the second stacking unit is configured to transfer the baked secondary battery from the second battery tray to the third conveying unit.

14. The baking apparatus for secondary battery of claim 13, the transferring device comprises a bracket, a beam horizontally movably connected to the bracket and a clamp component vertically movably connected to the beam.

15. An apparatus for baking a secondary battery, comprising:
   a feeding device, a discharging device spaced from the feeding device in a horizontal direction, a baking device disposed between the feeding device and the discharging device, and a transferring device,
   wherein the baking device comprises two or more baking ovens fixedly arranged in a column in a direction from the feeding device to the discharging device, each baking oven comprising a housing and a cover for connecting hermetically with the housing, and wherein the transferring device is configured to put a secondary battery to be baked, which is conveyed by the feeding device, into each baking oven, and take the baked secondary battery out of each baking oven and convey it to the discharging device, wherein the baking apparatus further comprises a raising device for moving each cover to close each housing with each cover or move each cover away from each housing, said raising device is configured to reciprocally move in the direction from the feeding device to the discharging device, wherein the feeding device comprises a third conveying unit, a fourth conveying unit disposed in intersection with the third conveying unit, a second turning unit, a second stacking unit and a second battery tray, wherein the second battery tray is configured to horizontally move close to or away from the baking device, the transferring device is configured to put the baked secondary battery into the second battery tray, and the second stacking unit is configured to transfer the baked secondary battery from the second battery tray to the third conveying unit.

16. A method for baking a secondary battery by using the baking apparatus for secondary battery which comprises:

a feeding device, a discharging device spaced from the feeding device in a horizontal direction, a baking device disposed between the feeding device and the discharging device, and a transferring device, wherein the baking device comprises two or more baking ovens fixedly arranged in a column in a direction from the feeding device to the discharging device, each baking oven comprising a housing and a cover for connecting hermetically with the housing, and wherein the transferring device is configured to put a secondary battery to be baked, which is conveyed by the feeding device, into each baking oven, and take the baked secondary battery out of each baking oven and convey it to the discharging device, wherein the baking apparatus further comprises a raising device for moving each cover to close each housing with each cover or move each cover away from each housing, said raising device is configured to reciprocally move in the direction from the feeding device to the discharging device, the method comprising:

conveying a secondary battery to be baked to a feeding position through a feeding device;

putting, with a transferring device, the secondary battery to be baked at the feeding position into an housing of a baking oven in static state, wherein the baking oven is located downstream of the feeding device;

covering the housing with an cover to seal the housing;

activating the baking oven to bake the secondary battery;

after the baking is finished, performing vacuum relief for the baking oven, removing the cover and using the transferring device to pick up and transfer the baked secondary battery from the housing to a discharging device which is located downstream of the baking oven; and conveying the baked secondary battery to a discharging position through the discharging device, wherein a cover to be removed from a baking oven that finishes the baking process is be placed on another cover of an adjacent baking oven; and after the transferring device finishes filling of the housing of the baking oven with secondary batteries, the cover is moved back onto the housing of the baking oven.

17. The method of claim 16, wherein the baking oven is vacuumized before the baking oven is activated to bake the secondary battery.

\* \* \* \* \*